(12) United States Patent
Campise et al.

(10) Patent No.: US 12,242,265 B2
(45) Date of Patent: Mar. 4, 2025

(54) VEHICLE TASK MANAGEMENT SYSTEMS AND METHODS

(71) Applicant: THE BOEING COMPANY, Chicago, IL (US)

(72) Inventors: Alex Jay Campise, Creve Coeur, MO (US); Vikram H. Pandya, Everett, WA (US)

(73) Assignee: THE BOEING COMPANY, Chicago, IL (US)

(*) Notice: Subject to any disclaimer, the term of this patent is extended or adjusted under 35 U.S.C. 154(b) by 70 days.

(21) Appl. No.: 17/555,587

(22) Filed: Dec. 20, 2021

(65) Prior Publication Data

US 2023/0195104 A1    Jun. 22, 2023

(51) Int. Cl.
*G05D 1/00* (2024.01)
*B64C 39/02* (2023.01)

(52) U.S. Cl.
CPC ......... *G05D 1/0027* (2013.01); *B64C 39/024* (2013.01); *G05D 1/0022* (2013.01); *G05D 1/104* (2013.01); *B64U 2201/20* (2023.01)

(58) Field of Classification Search
CPC .... G05D 1/0027; G05D 1/0022; G05D 1/104; B64C 39/024; B64U 2201/20
See application file for complete search history.

(56) References Cited

U.S. PATENT DOCUMENTS

| | | | | |
|---|---|---|---|---|
| 2003/0233178 A1* | 12/2003 | Sinex | ..................... | G06Q 10/06 701/29.1 |
| 2004/0059451 A1* | 3/2004 | Holtan | ............. | G05B 19/41865 700/100 |
| 2007/0050225 A1* | 3/2007 | Leslie | ................ | G06Q 10/1097 705/7.21 |
| 2014/0236465 A1* | 8/2014 | Greenlaw | ................ | G08G 5/00 701/120 |
| 2016/0347176 A1* | 12/2016 | Kawalkar | .............. | B60K 35/00 |
| 2017/0045884 A1* | 2/2017 | Kablaoui | ................ | H04L 67/12 |
| 2017/0323235 A1* | 11/2017 | Johnston | ................ | B64C 39/024 |
| 2021/0065560 A1* | 3/2021 | Ali | ......................... | G07C 5/008 |
| 2021/0200245 A1* | 7/2021 | Lim | ....................... | G05D 1/104 |
| 2023/0089977 A1* | 3/2023 | Venkatesh | ............ | G08G 5/0069 701/120 |

FOREIGN PATENT DOCUMENTS

FR        3090957 A1 * 6/2020     ......... G06Q 10/0631

OTHER PUBLICATIONS

Bertuccelli (Developing Operator Models for UAV Search Scheduling AIAA Guidance, Navigation, and Control Conference, Aug. 2-5, 2010, Toronto, Ontario Canada). (Year: 2010).*

(Continued)

*Primary Examiner* — Anne Marie Antonucci
*Assistant Examiner* — Jingli Wang
(74) *Attorney, Agent, or Firm* — The Small Patent Law Group LLC; Christopher R. Carroll

(57) ABSTRACT

A system for managing operation of a plurality of vehicles includes a user interface including a display. A control unit is in communication with the user interface and the plurality of vehicles. The control unit is configured to receive data from the plurality of vehicles and generate a task plan including tasks to be performed by an operator of the plurality of vehicles. The control unit is further configured to show the task plan on the display.

20 Claims, 8 Drawing Sheets

(56) References Cited

OTHER PUBLICATIONS

FR-3090957-A1 Machine translation (Year: 2020).*
Earliest Deadline First Scheduling Algorithm and Its Use in Anka UAV, 978-1-4673-1900-3/12/$31.00 © 2012 IEEE (Year: 2012).*
How does handover between Air Traffic Controllers work Feb. 2021 (Year: 2021).*
Youtube https://www.youtube.com/watch?v=BnWN4pN2ynU, Feb. 27, 2021 (Year: 2021).*

* cited by examiner

VEHICLE TASK MANAGEMENT SYSTEMS AND METHODS

FIELD OF THE DISCLOSURE

Examples of the present disclosure generally relate to systems and methods for managing operator-performed tasks of vehicles, such as aircraft.

BACKGROUND OF THE DISCLOSURE

Autonomous vehicles are being developed to operate with increasing independence, taking on additional responsibilities previously allocated to human agents. However, despite the ever-increasing capability of intelligent autonomous vehicles, human agents are typically still expected to manage and control some tasks for such vehicles, such as due to legal restrictions on how those vehicles can operate, limited capabilities of the automation, and the cost of certifying automated capabilities.

As autonomous vehicles take on more responsibilities from human agents, human agents are managing more vehicles. A unique challenge for a human agent, hereafter referred to as an operator, when managing multiple, independent, autonomous agents is efficiently selecting, deciding, and planning particular operational tasks.

The operator performs or otherwise completes at least some tasks for an autonomous vehicle. When managing a single vehicle, the operator can build situational awareness around the allocated tasks over time. Further, the process of selecting which task to perform is often sequential when managing one vehicle.

However, when managing multiple vehicles operating independently of each other (that is, not operating as a single unit such as a formation of aerial bombers), the operator may have a difficult time building and maintaining situational awareness. Additionally, there are limits to how much information an operator can keep track of at one time.

Moreover, selecting, deciding, and planning which task to perform and when is much more complicated when managing multiple vehicles. There are now many more tasks to manually weigh and balance against each other, adding mental overhead to every operator action. Also, with independent vehicles, the probability of encountering an event that disrupts existing plans (for example, engine failure) increases as a direct function of the number of vehicles. Adding to this problem is the difficulty of replanning due to the constraints imposed by each vehicle, a problem which also grows more difficult as the operator manages more vehicles.

As an example, in the aviation domain, there are collections of operator actions called procedures. Some of these procedures are memorized by operators as memory items, while others are described in checklists and tracked in contingency management systems. If pilots have to memorize and keep track of memory items for multiple vehicles, this can quickly make operator task load unmanageable. For example, an operator would have to mentally keep track of the procedures needed to supervise the vehicles, recall the proper procedures, and prioritize which procedures to execute from which checklist when there are potential conflicts.

SUMMARY OF THE DISCLOSURE

A need exists for a system and a method for efficiently managing tasks of autonomous vehicles. Further, a need exists for a system and a method for assisting an operator of multiple autonomous vehicles in relation to the various tasks for the vehicles.

With those needs in mind, certain examples of the present disclosure provide a system for managing operation of a plurality of vehicles. The system includes a user interface including a display, and a control unit in communication with the user interface and the plurality of vehicles. The control unit is configured to receive data from the plurality of vehicles and generate a task plan including tasks to be performed by an operator of the plurality of vehicles. The control unit is further configured to show the task plan on the display.

In at least one example, the task plan is based on the data received from the plurality of vehicles. In at least one example, the task plan includes a plurality of tasks for the plurality of vehicles. The plurality of tasks include required or recommended actions to be taken by the operator.

Each of the plurality of vehicles can be an autonomous vehicle that automatically performs one or more operations without human intervention. Each of the plurality of vehicle can be an unmanned aerial vehicle.

In at least one example, the control unit is remote from the plurality of vehicles.

In at least one example, the control unit is further configured to automatically perform one or more of the tasks in response to a deadline for the one or more tasks being reached without the operator performing the one or more tasks.

In at least one example, the control unit is configured to generate the task plan based on relative urgency and temporal requirements of the tasks.

In at least one example, the control unit is further configured to provide, on the display, at least one alert indicator with respect to at least one of the tasks within the task plan.

Certain examples of the present disclosure provide a method for managing operation of a plurality of vehicles. The method includes receiving, by a control unit in communication with a user interface and the plurality of vehicles, data from the plurality of vehicles; generating, by the control unit, a task plan including tasks to be performed by an operator of the plurality of vehicles; and showing, by the control unit, the task plan on a display of the user interface.

DETAILED DESCRIPTION OF THE DISCLOSURE

Figure 1:
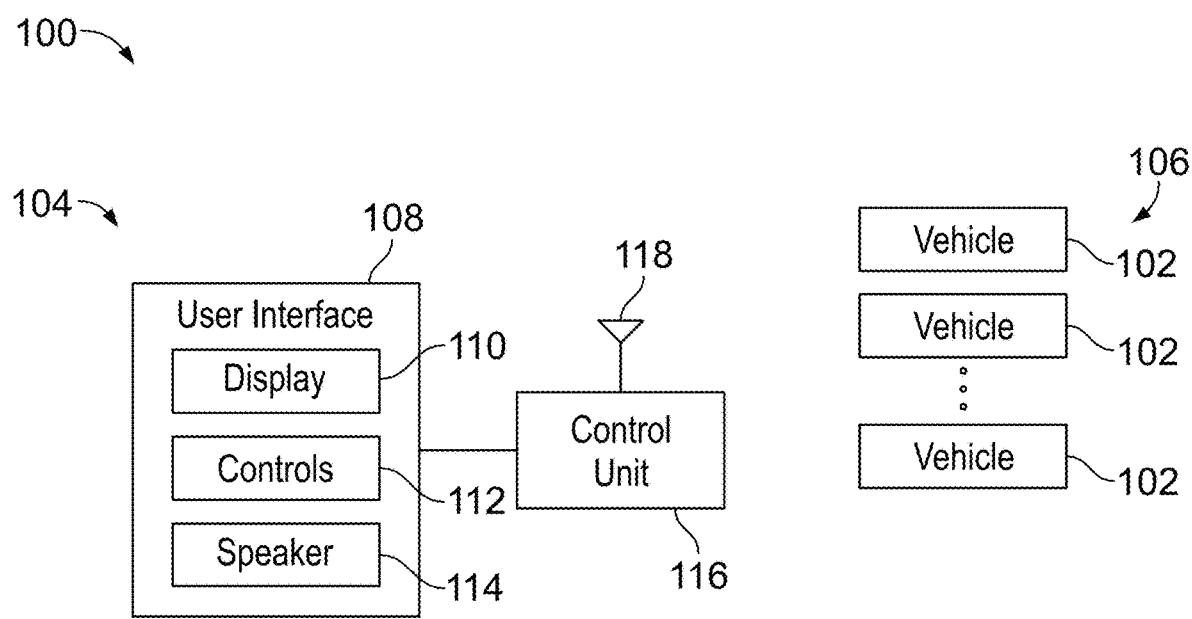
FIG. 1 illustrates a schematic block diagram of a system for managing operation of a plurality of vehicles, according to an example of the present disclosure.

The foregoing summary, as well as the following detailed description of certain examples will be better understood when read in conjunction with the appended drawings. As used herein, an element or step recited in the singular and preceded by the word "a" or "an" should be understood as not necessarily excluding the plural of the elements or steps. Further, references to "one example" are not intended to be interpreted as excluding the existence of additional examples that also incorporate the recited features. Moreover, unless explicitly stated to the contrary, examples "comprising" or "having" an element or a plurality of elements having a particular condition can include additional elements not having that condition.

Examples of the present disclosure provide a task management system and method for vehicles, such as autonomous vehicles (for example, unmanned aerial vehicles). In at least one example, the system generates and displays an optimized task plan (for example, a prioritized list of tasks) for an operator of a plurality of vehicles. The tasks are defined as collections of required or recommended actions by the operator. The system receives required tasks for each vehicle, prioritizes them to create the task plan, and then conveys the task plan to the operator through a user interface. Additionally, the system receives operator inputs regarding changes to the task plan, in order to track the completion of tasks in the task plan.

In at least one example, the system is configured to utilize a relative importance of tasks (as defined by a warning-caution-advisory contingency level) and temporal requirements for the tasks, in order to propose a planned task execution order to the operator. The system is further configured to electronically display the task plan to the operator. The operator is allowed to interact with the stored task plan. The system is further configured to automatically show related electronic checklists as needed for tasks selected by the operator.

The systems and methods described herein reduce operator task load. For example, the system can automatically optimize a task plan, thereby freeing the operator to focus on task execution. As such, examples of the present disclosure can be used to assist operators with rapid task replanning in response to unforeseen events.

The systems and methods reduce operational error. For example, when the system prioritizes tasks according to temporal requirements, a decision-aid is created that reduces occurrence of missed or overlooked operator actions.

Additionally, examples of the present disclosure allow an operator to efficiently and effectively supervise multiple vehicles. Each vehicle has a set of tasks the operator typically completes. Planning what tasks to execute and when to execute them, thus becomes many times more complicated for multiple vehicles versus planning for one vehicle. The systems and methods described herein organize and manage the various tasks associated with each vehicle, and put them together into one unified task plan for the operator.

Additionally, the systems and methods described herein reduce operator training. Currently, operators memorize the tasks needed to complete their normal operations and the order of their execution. The systems and methods described herein order the tasks for completion, thereby creating a task plan.

Examples of the present disclosure provide a system for managing tasks associated with multiple vehicles, such as autonomous vehicles (for example, unmanned aerial vehicles). The system includes a control unit that allows a single human agent (that is, an operator) to efficiently and effectively control operation of the vehicles.

FIG. 1 illustrates a schematic block diagram of a system 100 for managing operation of a plurality of vehicles 102, according to an example of the present disclosure. In at least one example, the vehicles 102 are autonomous vehicles that automatically perform one or more operations without human intervention. For example, the vehicles 102 can be land-based drones. As another example, the vehicles 102 can be air-based drones, such as unmanned aerial vehicles (UAVs). As another example, the vehicles 102 can be water-based drones. As another example, the vehicles 102 can be space-based drones. The system 100 can be configured to control operation of more or less vehicles 102 than shown. For example, the system 100 can be configured to control four or more vehicles 102. As another example, the system 100 can be configured to control two vehicles 102.

While the vehicles 102 can be autonomous vehicles that automatically perform one or more operations without human intervention (for example, a UAV can automatically activate engines, operate various control surfaces, and automatically fly between different locations without human intervention), there are certain tasks that the human agent (that is, the operator) performs. Examples of such operational tasks performed by the operator include selecting a particular flight plan from a plurality of possible flight plans, acknowledging a communication or lack thereof with a vehicle, acknowledging radar vector, assigning order for landing, transferring to different locations, requesting clearance for landing, and/or the like. The operator is located at a location 104 that can be remote from an environment 106 in which the vehicles 102 are located. For example, the location 104 is a land-based central monitoring station, and the environment 106 can be an airspace remote from or surrounding the location 104.

The tasks are actions to be taken by the operator, via the user interface, to manage and control operation of the vehicles 102. In contrast to automatic operations performed by the vehicles 102, the tasks typically require execution by the operator.

The system 100 further includes a user interface 108 at the location 104. The user interface 108 can be a workstation that allows the operator to control operation of the vehicles 102. The user interface 108 allows the operator to manage and control the vehicles 102 from the location 104.

The user interface 108 includes a display 110, such as an electronic monitor, screen, touchscreen interface, and/or the like. The display 110 is configured to show graphics, video, text messages, and/or the like for the operator to view. The user interface 108 further includes one or more controls 112 configured to manage and/or control operation of the vehicles 102. The controls 112 can include one or more of a keyboard, mouse, voice recognition, buttons, dials, joystick(s), control stick(s), a touchscreen interface, and/or the like. In at least one example, the user interface 108 can also include a speaker 114, which is configured to output audio signals, such as warning sounds. Optionally, the user interface 108 does not include the speaker 114.

A control unit 116 is in communication with the user interface 108, such as through one or more wired or wireless connections. The control unit 116 can be separate and distinct from the user interface 108. In at least one other example, the user interface 108 includes the control unit 116. The control unit 116 is in communication with the display 110, the controls 112, and the speaker 114, such as through one or more wired or wireless connections.

The control unit 116 is further in communication with the vehicles 102, such as through a communication device 118. Examples of the communication device 118 include one or more antennas, one or more transceivers, and/or the like.

In operation, the control unit 116 receives data from each of the vehicles 102. Examples of the data includes information regarding position, heading, velocity, flight plan, tasks to be performed, and the like. The control unit 116 receives the data for each of the vehicles 102 and determines a task plan regarding all of the vehicles 102 for the operator to view. The task plan is determined based on a priority of the tasks to be performed for the various vehicles. The priority of the tasks is determined based on the location of the vehicles 102 within the environment, deadlines for performing tasks for each vehicle 102, and the like. The control unit 116 determines a prioritized list for each of the tasks and lists them in order on the task plan. The control unit 116 then shows the task plan on the display 110 for the operator to view.

In at least one example, each task to be performed by the operator has a deadline for execution. That is, each task is to be performed by the operator by the deadline. If the task has not been performed by the deadline, and/or within a predetermined period of time before the deadline (for example, within 5 seconds or less before the deadline), the control unit 116 can automatically perform the task, and therefore automatically control operation of one or more of the vehicles 102 according to the task. In at least one example, the control unit 116 automatically performs one or more of the tasks set forth in the task plan in response to a deadline for the one or more tasks being reached without the operator performing the one or more tasks.

In at least one example, the control unit 116 generates and shows on the display 110 an optimized task plan (for example, a prioritized list of tasks) for the operator of the vehicles 102. The tasks are defined as collections of required or recommended actions to be performed by the operator. The control unit 116 receives the required tasks (via the received data) for each vehicle 102 (such as from the vehicles 102). The control unit 116 then, prioritizes the tasks to create the task plan, and then shows the task plan to the operator on the display 110. The operator can then interact with the user interface, such as via the controls, to indicate completion of tasks. In this manner, the control unit 116 inputs from the operator regarding changes to the task plan, in order to track the completion of tasks in the task plan.

In at least one example, the control unit 116 is configured to utilize a relative urgency (for example, importance of, or required actions) of tasks (as defined by a warning-caution-advisory contingency level received in the data from the vehicles 102) and temporal requirements for the tasks, in order to propose a planned task execution order for the task plan. The control unit 116 can further automatically show, on the display 110, related electronic checklists as needed for tasks selected by the operator.

In at least one example, the control unit 116 provides a task manager for the plurality of vehicles 102. The control unit 116 is configured to assist the operator with selecting, deciding, and planning which tasks to perform in order to efficiently manage and control the vehicles 102.

Through the data received from the vehicles 102, the control unit 116 loads operator tasks required for each vehicle 102 that is to be controlled by the operator via the user interface 108. The control unit 116 further tracks the status of the tasks based on external data sources including operator input, vehicle subsystem status data, vehicle navigation data, communications data, and/or the like.

The control unit 116 creates the task plan based on the data received from the vehicles 102. The task plan provides an ordered list of tasks to be performed by the operator. The control unit 116 prioritizes the tasks based on various parameters, such as contingency level (for example, a particular event occurs in relation to a vehicle, which triggers a particular task to be performed), temporal requirements (for example, times for completion), importance as defined by a precedence level, and/or the like. In at least one example, the control unit 116 can further optimize the task plan by identifying and filling gaps where no task is projected to be completed by the operator. The control unit 116 further updates the task plan based on detected state changes (for example, inputs from the operator indicating completion of certain tasks).

The control unit 116 presents the task plan to the operator on the display 110, for example. For example, the task plan, as shown on the display 110, is in a form that that lists the various tasks based on their contingency level, followed by their assumed order of execution. The control unit 116 can further output a signal to an electronic checklist system to display a checklist on the display 110 associated with a task.

In at least one example, the control unit 116 is configured to allow the operator to interact with the task plan, via the user interface 108, such as by selecting a task to complete or work, closing a task to indicate its completion, adding a task to the task plan, and/or the like. The control unit 116 is further configured to alert the operator about critical tasks, such as tasks tied to events that affect survivability of the vehicles 102. For example, the control unit 116 can emit audio signals, such as aural chimes, alarms, recorded utterances, and the like, through the speaker 114. As another example, the control unit 116 can control the display 110 to provide visual signals, such as flashing lights or other symbols.

As noted, the control unit 116 provides a task planner that generates the task plan, which is a prioritized list of tasks to be performed by the operator of the vehicles 102. The control unit 116 presents the task plan to the operator via the user interface 108, such as by showing the task plan on the display 110. The tasks are defined as collections of required or recommended operator actions. The tasks listed on the task plan are to be completed sequentially, such as from a top of the listed tasks to a bottom of the list.

A task is one or more actions for a vehicle 102 which a human agent (that is, the operator) is to complete. In at least one example, a task includes an availability state, in which a task can either be available or unavailable. Unavailable tasks should not be worked by the operator because one or more conditions for beginning work on the task has not been met. For example, when a UAV is approaching an airport to make a landing, a handoff from an Approach Controller 900 to a Tower Controller 902 would be unavailable if the operator is not yet in contact with the Approach Controller 900. Available tasks can be worked by the operator because the conditions for their readiness to be worked have been met. Tasks transition from unavailable to available, based on one or more conditions being met, such as the arrival of a vehicle 102 at a waypoint or other such location, a particular time (such as Oct. 28, 2022 at 11:30 AM), completion of another task, change in some property of a vehicle mission plan's status from one state to another, such as a transition from the cruise to the descent phase of flight, change in the value of some subsystem property above, below, or at some threshold (for example, when fuel reserves fall below a predefined critical level), reception of a communications message, a fixed amount of time after the occurrence of a condition listed above, a fixed amount of time before the estimated occurrence of a condition listed above, and/or the like.

A task can be either in work or not in work. A task that is in work is a task on which the operator is currently working. A task that is not in work is not currently being worked on by the operator.

A task can be either complete or incomplete. Incomplete tasks have some set of actions that have not yet been successfully performed by the operator. Complete tasks have all the associated actions in the task performed by the operator, and/or the operator has indicated such tasks are complete.

Availability time is a point in time representing when a task is available to be worked. The task availability time can be an estimate, and can be based on calculations done to estimate the point in time where conditions for a task for availability, such as those listed for the availability state, will all be met.

Deadline time is a point in time representing when a task should or must be completed. The task deadline time can also an estimate, and can be based on calculations that estimate when a task must be complete, based around conditions such as those listed for the availability state.

Estimated work length is a quantity of time representing the estimated length of time it will take for the operator to complete the task. Time task worked is a quantity of time representing the amount of time the operator has spent working on the task. The longer a task is in work, the shorter the estimated work length becomes, such that every increase in the time task worked is subtracted from the estimated work length. Start time is a point in time in which the operator is projected to start working on the task. End time is a point in time in which the operator is projected to complete working on the task, which is typically the start time plus the estimated work length. Projected tardiness state is when a task can either be projected to be either on-time or late. On-time tasks are projected to be completed before some defined deadline based on the current task plan. Late tasks are projected to not be completed before some defined deadline based on the current task plan.

Contingency level relates to when a task can be associated with one of different levels based on the Warning-Caution-Advisory (WCA) alerting definitions found in MIL-STD 411F. Warning-Level tasks are defined as tasks that require immediate intervention due to a hazardous condition. Caution-Level tasks are defined as tasks that require immediate attention but not immediate action. Advisory-Level tasks are defined as tasks that require neither immediate attention nor immediate action. Normal tasks, such as those that are routine tasks performed during a normal flight with no abnormal events, are categorized as advisory-level tasks.

Precedence level relates to a level which is associated with the relative importance of the task. Precedence level can be used to prioritize tasks. Precedence level is used in special cases where there is a particular need to finish a task or set of tasks on time or earlier than other tasks. For example, if a vehicle 102 has some emergency condition, the precedence level of the associated tasks for the vehicle 102 could be elevated by the operator. Tasks not associated with the vehicle 102 can be moved out of the way, even if it would make the tasks with lower precedence late.

Vehicle identifier is a name that associates the task with a specific vehicle. Task name is a name used to convey the identity and nature of the task. A checklist is a sequential list of actions and decisions for the operator to take in order to complete the task. These can be displayed in an interactive electronic checklist. The user interface 108 provides such list of actions to the operator, and the operator follows the actions as described in the checklist.

As described herein, the system 100 for managing operation of the plurality of vehicles 102 includes the user interface 108 including the display 110. The control unit 116 is in communication with the user interface 108 and the plurality of vehicles 102. The control unit 116 is configured to receive data from the plurality of vehicles 102 and generate a task plan including tasks to be performed by an operator (for example, one human agent) of the plurality of vehicles 102. In at least one example, the task plan is based on the data received from the plurality of vehicles 102. The control unit 116 is further configured to show the task plan on the display 110.

As used herein, the term "control unit," "central processing unit," "CPU," "computer," or the like may include any processor-based or microprocessor-based system including systems using microcontrollers, reduced instruction set computers (RISC), application specific integrated circuits (ASICs), logic circuits, and any other circuit or processor including hardware, software, or a combination thereof capable of executing the functions described herein. Such are exemplary only, and are thus not intended to limit in any way the definition and/or meaning of such terms. For example, the control unit 116 may be or include one or more processors that are configured to control operation, as described herein.

The control unit 116 is configured to execute a set of instructions that are stored in one or more data storage units or elements (such as one or more memories), in order to process data. For example, the control unit 116 may include or be coupled to one or more memories. The data storage units may also store data or other information as desired or needed. The data storage units may be in the form of an information source or a physical memory element within a processing machine.

The set of instructions may include various commands that instruct the control unit 116 as a processing machine to perform specific operations such as the methods and processes of the various examples of the subject matter described herein. The set of instructions may be in the form of a software program. The software may be in various forms such as system software or application software. Further, the software may be in the form of a collection of separate programs, a program subset within a larger program, or a portion of a program. The software may also include modular programming in the form of object-oriented programming. The processing of input data by the processing machine may be in response to user commands, or in response to results of previous processing, or in response to a request made by another processing machine.

The diagrams of examples herein may illustrate one or more control or processing units, such as the control unit 116. It is to be understood that the processing or control units may represent circuits, circuitry, or portions thereof that may be implemented as hardware with associated instructions (e.g., software stored on a tangible and non-transitory computer readable storage medium, such as a computer hard drive, ROM, RAM, or the like) that perform the operations described herein. The hardware may include state machine circuitry hardwired to perform the functions described herein. Optionally, the hardware may include electronic circuits that include and/or are connected to one or more logic-based devices, such as microprocessors, processors, controllers, or the like. Optionally, the control unit 116 may represent processing circuitry such as one or more of a field programmable gate array (FPGA), application specific integrated circuit (ASIC), microprocessor(s), and/or the like. The circuits in various examples may be configured to execute one or more algorithms to perform functions described herein. The one or more algorithms may include aspects of examples disclosed herein, whether or not expressly identified in a flowchart or a method.

As used herein, the terms "software" and "firmware" are interchangeable, and include any computer program stored in a data storage unit (for example, one or more memories) for execution by a computer, including RAM memory, ROM memory, EPROM memory, EEPROM memory, and non-volatile RAM (NVRAM) memory. The above data storage unit types are exemplary only, and are thus not limiting as to the types of memory usable for storage of a computer program.

Figure 2:
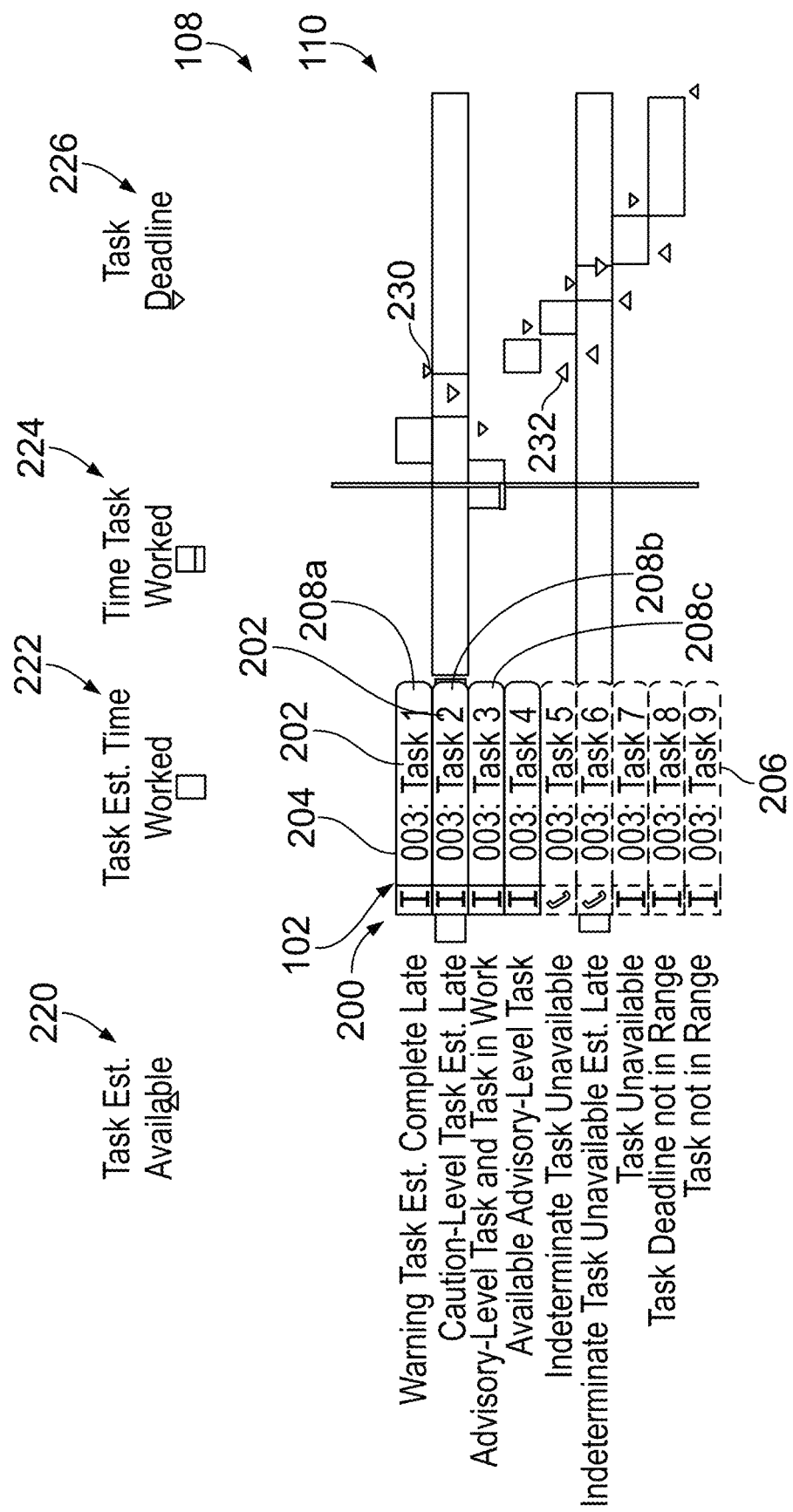
FIG. 2 illustrates a front view of a display of a user interface showing a task list, according to an example of the present disclosure.

FIG. 2 illustrates a front view of the display 110 of the user interface 108 showing a task list 200, according to an example of the present disclosure. The task list 200 provides a prioritized list of tasks 202 for the plurality of vehicles 102 in a sequential order for completion. For example, tasks that are closer to a top 204 of the task list 200 are to be performed by the operator before tasks that are closer to a bottom 206 of the task list 200.

Referring to FIGS. 1 and 2, the control unit 116 presents the task list 200 to the operator on the display 110. The control unit 116 may provide alert indicators 208*a*, 208*b*, and 208*c*, for example, associated with the various tasks 202. The alert indicators relate to urgency for completion. For example, alert indicator 208*a* can be a flashing light, color, or the like that indicates a task that is to be completed as soon as possible. Alert indicator 208*b* can be a different flashing light, color, or the like that indicates a task that is to be completed within a predetermined time period, such as within 1 minute or less. Alert indicator 208*c* may be a different flashing light, color, or the like that indicates a task that is to be completed within a different predetermined time period, such as within 5 minutes or less. The control unit 116 can indicate various different alert indicators associated with various predetermined levels of urgency for completion.

As shown, the control unit 116 is configured to provide various information to the operator on the display 110. For example, the control unit 116 can show the estimated availability time 220, the estimated work length 222, the time task worked 224, task deadlines 226, current time 228, task completion icons 230, uncompleted task icons 232, and/or the like.

As shown in FIG. 2, the control unit 116 generates the task plan 200, such as by sorting by contingency, and, within each contingency level, sorting by deadline. The task deadlines cascade down and to the right as the task list 200 progresses. Task 1 is a warning level task. Task 1 can have a deadline that is later than Task 2, yet is still placed at the top of the task list 200, because the control unit 116 can be configured to sorts tasks so that warning level tasks are to be worked before caution level tasks and advisory level tasks. In at least one example, the control unit 116 generates the task plan 200 by prioritizing tasks by contingency, reducing the lateness of tasks, reducing operator idle time, and prioritizing tasks that are flagged as more important than others.

In at least one example, the control unit 116 sorts the tasks in input task lists (received from the vehicles 102) into groups corresponding to contingency level and task deadline. In at least one example, the control unit 116 sorts the tasks based on the following: (a) Warning-level tasks come before caution-level and advisory-level tasks, (b) Caution-level tasks come before advisory-level tasks and after warning-level tasks, and (c) Advisory-level tasks come after warning-level and caution-level tasks. Within each contingency group, tasks are sorted by deadline, where tasks with earlier deadlines come before tasks with later deadlines.

In at least one example, the control unit 116 identifies gaps where the operator is not scheduled to be working on any task (for example, between the estimated completion time of a task and the estimated start of a subsequent task). Assuming the tasks are worked in the order of the task plan 200 generated by the control unit 116, these are spans of time where the operator will be waiting for the next task to become available. For each gap identified, the control unit 116 can identify collections of tasks that are scheduled to be worked after each gap. For identified collection, the control unit 116 can further identify tasks that are small enough, in terms of the estimated time they will be worked, to fit in that gap. For such identified small tasks, the control unit 116 can re-position those tasks before the task taking place after the associated gap identified. The control unit 116 can repeat such process.

The control unit 116 can further determine whether a task under examination, hereafter referred to as Task E, is projected to be late (that is, projected to not be completed by Task E's deadline). If Task E is protected to be late, the control unit 116 further identifies whether Task E has a higher precedence level (for example, the tasks for Vehicle 1 take precedence over the tasks for Vehicle 2) than a predetermined baseline level. If so, the control unit 116 further identifies tasks in the same contingency group as Task E which a) come before task E, b) have a lower precedence level than Task E, and c) are not the Task in Work. If any such tasks are identified, the control unit 116 identifies the nearest position among the positions occupied by this group of tasks where Task E, if moved there, would no longer be late. If any such tasks are identified, and the control unit 116 further identifies no position where Task E would no longer be late, the control unit 116 identifies positions among the positions occupied by this group of tasks where Task E, if moved there, would have reduced lateness (for example, reducing the time Task E is overdue from 10 minutes to 5 minutes). If any such positions are identified, the control unit 116 further identifies which of those positions would reduce Task E's lateness the most. Then, the control unit 116 can insert Task E before the task occupying the position identified.

Figure 3:
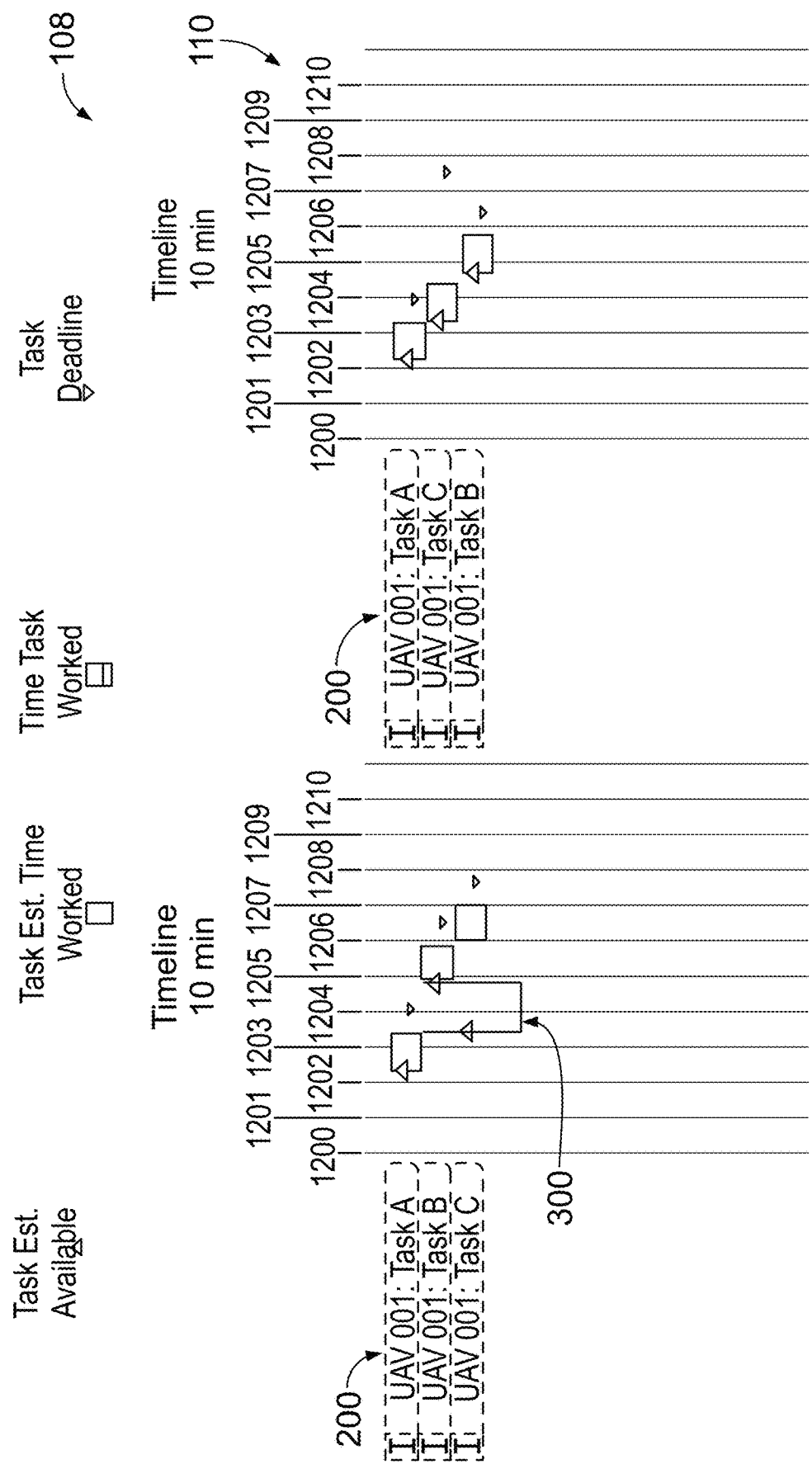
FIG. 3 illustrates a front view of a display of a user interface showing a task list, according to an example of the present disclosure.

FIG. 3 illustrates a front view of the display 110 of the user interface 108 showing the task list 200, according to an example of the present disclosure. As shown, a gap 300 exists between the end of Task A and the start of Task B. Referring to FIGS. 1 and 3, the control unit 116 can the find a subsequent task that can fit within the gap 300. As an example, the control unit 116 determines that Task C can fit within the gap 300. As such, the control unit 116 reorders the task plan 200 and inserts Task C between Task A and Task B.

Figure 4:
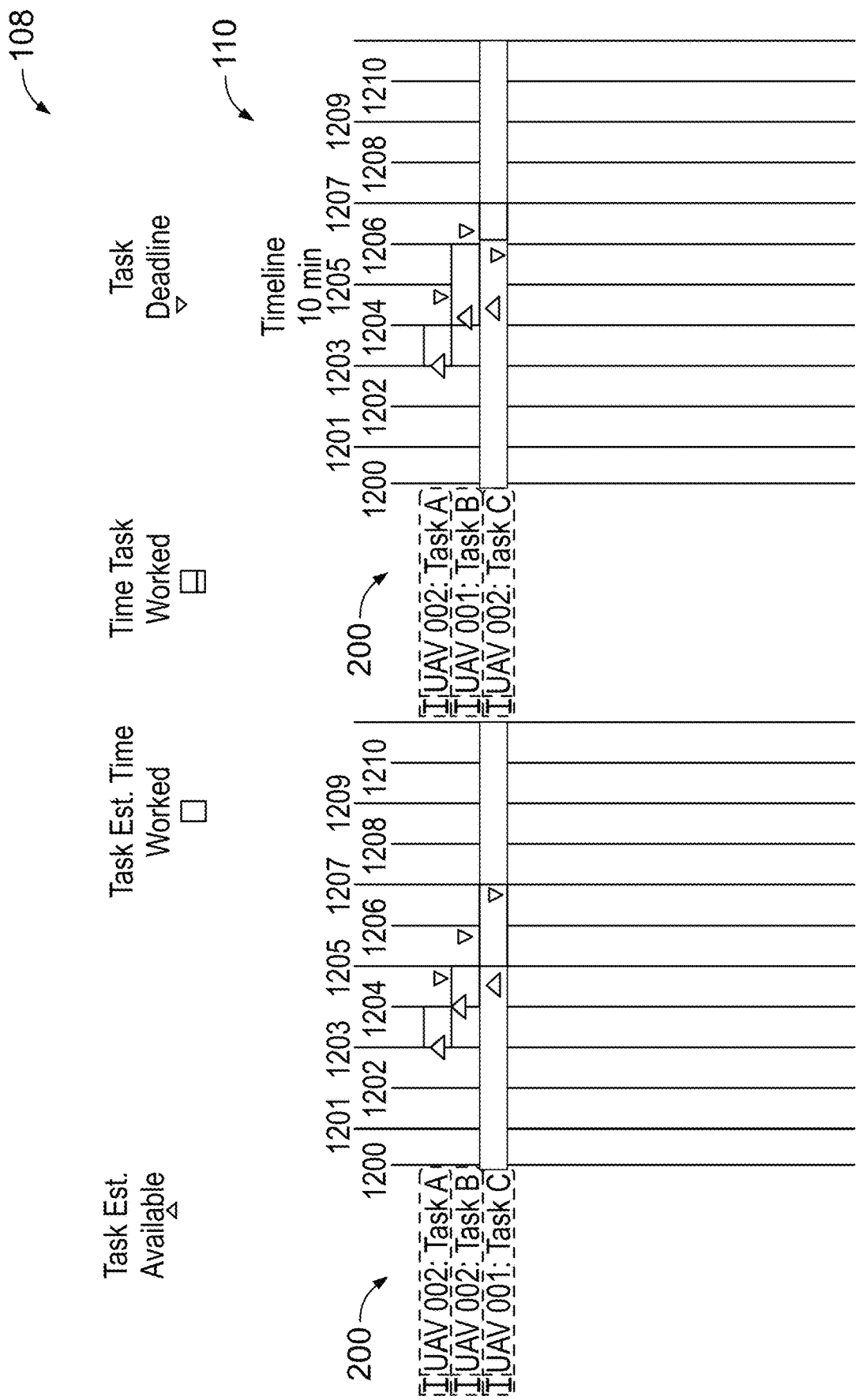
FIG. 4 illustrates a front view of a display of a user interface showing a task list, according to an example of the present disclosure.

FIG. 4 illustrates a front view of the display 110 of the user interface 108 showing the task list 200, according to an example of the present disclosure. Referring to FIGS. 1 and 4, the control unit 116 determines that Task C is projected to be late. The control unit 116 further determines that Tack C has a higher precedence level than normal, such as if tasks for UAV 001 takes precedence over tasks for UAV 002. The control unit 116 then identifies that Task A and Task B have a lower precedence level than Task C. The control unit 116 then determines that if Task C were moved the position of Task B, Task C would no longer be later. Accordingly, the control unit 116 then inserts Task C before Task B.

Figure 5:
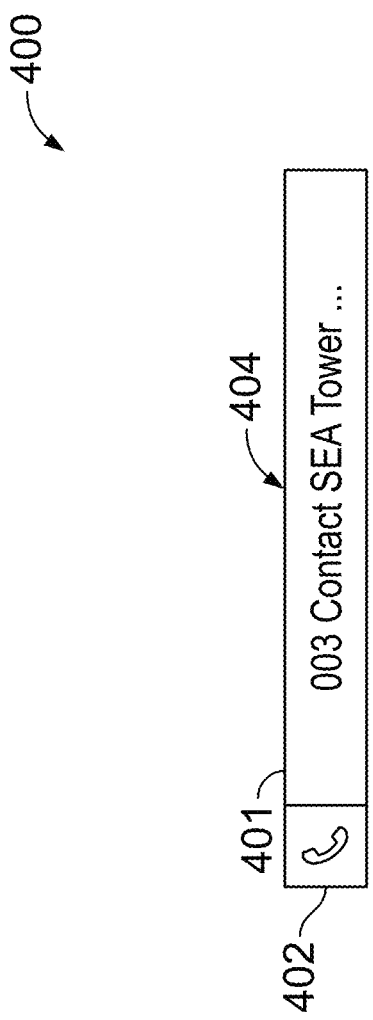
FIG. 5 illustrates a task widget, as can be shown on the display, according to an example of the present disclosure.

FIG. 5 illustrates a task widget 400, as can be shown on the display, according to an example of the present disclosure. A task widget 400 represents a task to be inserted into a task plan. In at least one example, each task widget 400 includes a vehicle identifier 401, such as a vehicle callsign number, a task icon 402, and a task description 404. The task widgets 400 can be color coded based on various parameters. For example, the task widgets 400 can be colored based on a level of precedence, urgency, and/or the like. As another example, the task widgets 400 can be color coded based on contingency level. The colors can be different based on whether the task is a task in work, currently being worked, and/or the like.

Referring to FIGS. 1-5, the task widgets 400, such as shown in FIG. 5, can be shown within a display format, such as in an ordered list. Tasks are presented in the order of the task plan 200. When a task is selected by an operator as the task in work, and the selected task is not the first task in the task plan 200, the control unit 116 presents the position of the task in work on the display to be after the task that preceded it before it became the task in work. Such rule can apply only so long as that task is the task in work, and does not affect the order of the tasks in the task plan. This feature can be implemented to prevent the task in work from jumping to the top of the displayed list, to stabilize the position of the task in work in the displayed list, and to provide an indication to the operator where the control unit 116 determines the task in work should be placed in the task plan 200.

Figure 6:
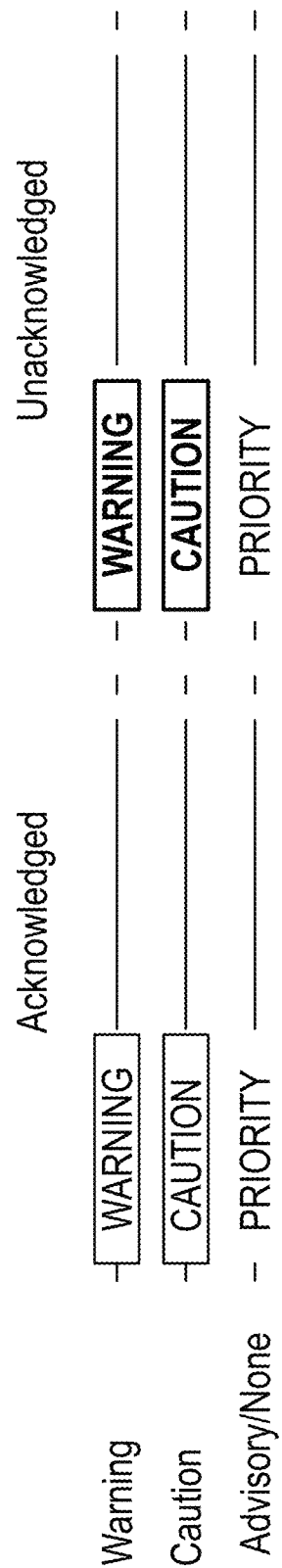
FIG. 6 illustrates alerts on a display, according to an example of the present disclosure.

FIG. 6 illustrates alerts (for example, alert indicators) on the display 110, according to an example of the present disclosure. Referring to FIGS. 1 and 6, the control unit 116 can also provide alert indicators to the operator regarding the occurrence of certain events. The alert indicators can include a warning, a caution, and an advisory. When a caution or warning level task appears in a task list, the level of the alert indicator can be conveyed by the control unit 116, such as via a sound or sounds, such as an aural chime and a recorded utterance, and/or visual signals such as a change in the color of a label and flashing text.

Figure 7:
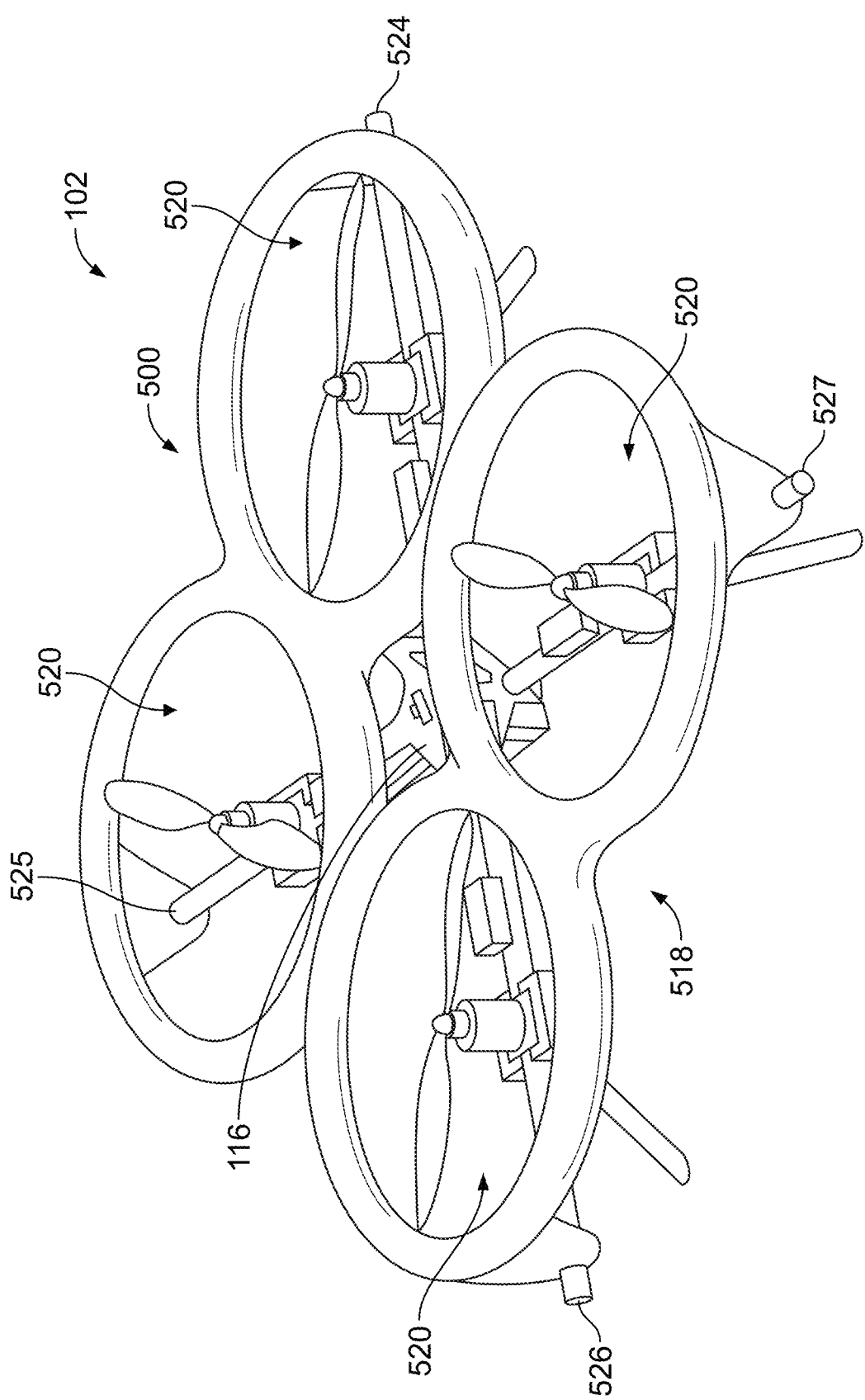
FIG. 7 illustrates a top view of an example of a vehicle, according to an example of the present disclosure.

FIG. 7 illustrates a top view of an example of a vehicle 102 according to an examples of the present disclosure. In at least one example, the vehicle 102 is an unmanned aerial vehicle (UAV) 500. As shown in FIG. 7, the UAV 500 may include an airframe 518 and a plurality of propulsion systems 520 coupled to the airframe 518. In general, the airframe 518 forms the structural body or framework for the UAV 500. In the illustrated embodiment shown in FIG. 7, the UAV 500 includes four propulsion systems 520, such that each propulsion system 520 is mounted to a respective arm 524, 525, 526, and 527. In the illustrated embodiment, the UAV 500 includes four arms 524-527 and a single propulsion system 520 that is mounted to each respective arm 524-527. Optionally, the UAV 500 may include more or less propulsion systems 520, more or less propulsion systems 520 per arm 524-527, and more or less arms 524-527 than shown.

Also, optionally, instead of the UAV shown in FIG. 7, the UAV 500 may include a fuselage, wings, a tail, and the like. In this manner, the UAV 500 may be designed as an unmanned airplane.

The UAV 500 shown and described with respect to FIG. 7 is but one example of a vehicle 102, as shown in FIG. 1. Optionally, the vehicles 102 can be various other autonomous vehicles, whether land-based, air-based, water-based, spaced-based, or the like.

Figure 8:
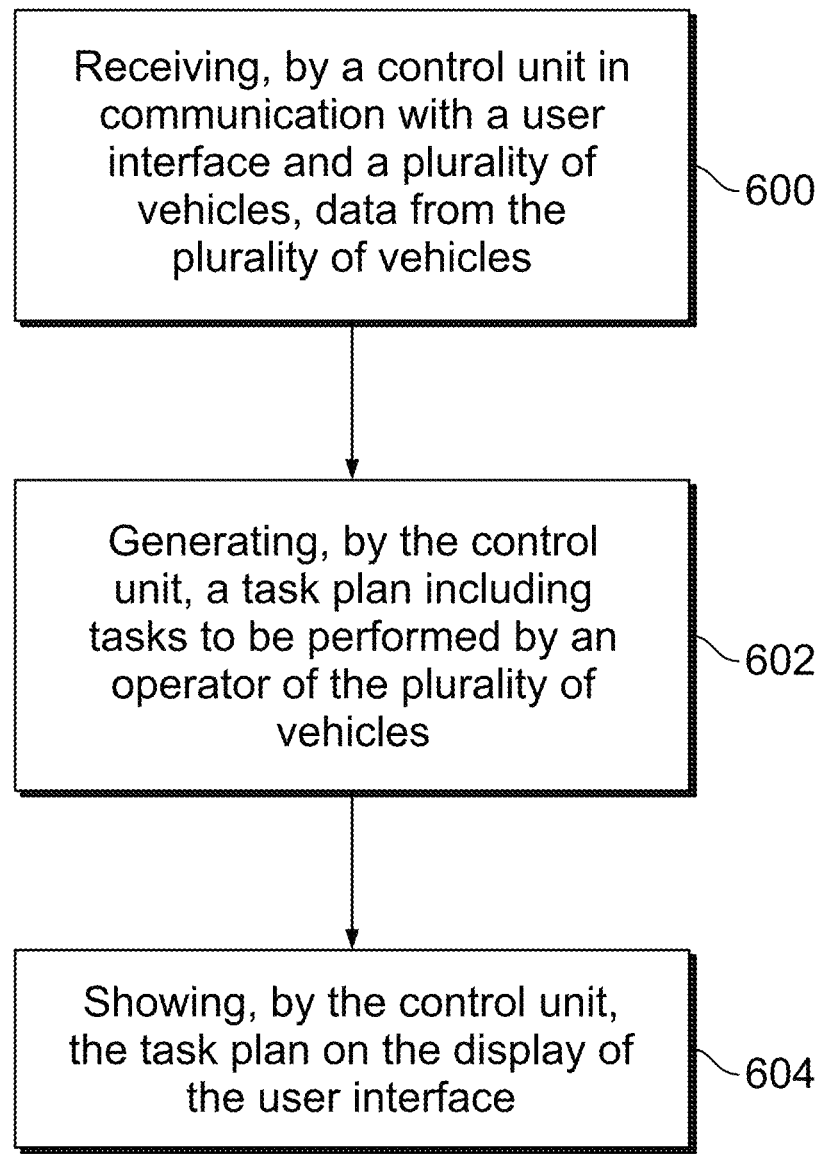
FIG. 8 illustrates a flow chart of a method of managing operation of a plurality of vehicles, according to an example of the present disclosure.
Figure 9:
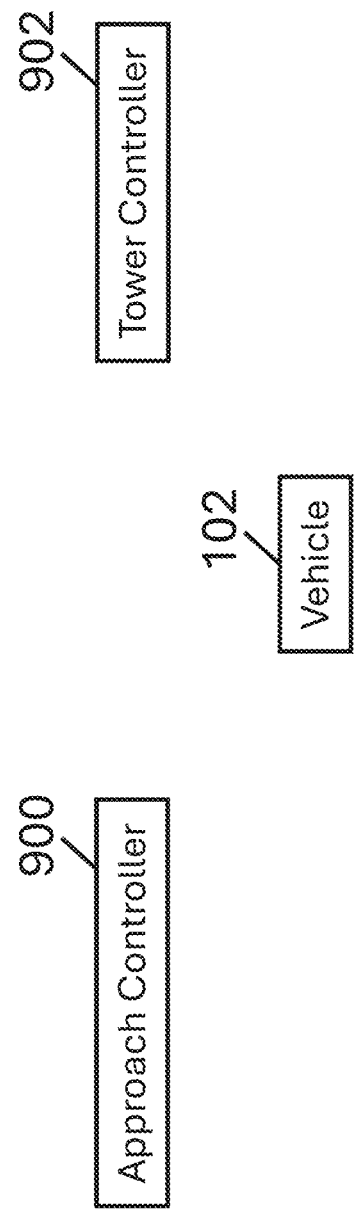
FIG. 9 illustrates a UAV approaching an airport to make a landing during a handoff from an approach controller to a tower controller.

FIG. 8 illustrates a flow chart of a method for managing operation of a plurality of vehicles, according to an example of the present disclosure. Referring to FIGS. 1 and 8, the method includes receiving 600, by the control unit 116 in communication with the user interface 108 and the plurality of vehicles 102, data from the plurality of vehicles 102; generating 602, by the control unit 116, a task plan including tasks to be performed by an operator of the plurality of vehicles 102; and showing 604, by the control unit 116, the task plan on the display 110 of the user interface 108. In at least one example, the method also includes automatically performing, by the control unit 116, one or more of the tasks in response to a deadline for the one or more tasks being reached without the operator performing the one or more tasks. In at least one example, the method also includes providing, by the control unit 116 on the display 110, at least one alert indicator with respect to at least one of the tasks within the task plan.

Referring to FIGS. 1-8, examples of the present disclosure provide systems and methods that allow large amounts of data to be quickly and efficiently analyzed by a computing device. For example, numerous aircraft can be controlled and monitored and managed by an operator. The vast amounts of data from the aircraft are efficiently organized and/or analyzed by the control unit 116 to determine a task plan, as described above. The control unit 116 analyzes the data in a relatively short time in order to quickly and efficiently generate, display, and update the task plan for the operator. A human being would be incapable of efficiently analyzing such vast amounts of data in such a short time. As such, examples of the subject disclosure provide increased and efficient functionality, and vastly superior performance in relation to a human being memorizing checklists and orders of operation, for example.

In at least one embodiment, components of the system 100, such as the control unit 116, provide and/or enable a computer system to operate as a special computer system for generating, displaying, updating, and the like a task plan for a plurality of vehicles 102.

Further, the disclosure comprises examples according to the following clauses:

Clause 1. A system for managing operation of a plurality of vehicles, the system comprising:
  a user interface including a display; and
  a control unit in communication with the user interface and the plurality of vehicles, wherein the control unit is configured to receive data from the plurality of vehicles and generate a task plan including tasks to be performed by an operator of the plurality of vehicles, and wherein the control unit is further configured to show the task plan on the display.

Clause 2. The system of Clause 1, wherein the task plan is based on the data received from the plurality of vehicles.

Clause 3. The system of Clauses 1 or 2, wherein the task plan comprises a plurality of tasks for the plurality of vehicles, and wherein the plurality of tasks include required or recommended actions to be taken by the operator.

Clause 4. The system of any of Clauses 1-3, wherein each of the plurality of vehicles is an autonomous vehicle that automatically performs one or more operations without human intervention.

Clause 5. The system of any of Clauses 1-4, wherein each of the plurality of vehicle is an unmanned aerial vehicle.

Clause 6. The system of any of Clauses 1-5, wherein the control unit is remote from the plurality of vehicles.

Clause 7. The system of any of Clauses 1-6, wherein the control unit is further configured to automatically perform one or more of the tasks in response to a deadline for the one or more tasks being reached without the operator performing the one or more tasks.

Clause 8. The system of any of Clauses 1-7, wherein the control unit is configured to generate the task plan based on relative urgency and temporal requirements of the tasks.

Clause 9. The system of any of Clauses 1-8, wherein the control unit is further configured to provide, on the display, at least one alert indicator with respect to at least one of the tasks within the task plan.

Clause 10. A method for managing operation of a plurality of vehicles, the method comprising:

receiving, by a control unit in communication with a user interface and the plurality of vehicles, data from the plurality of vehicles;

generating, by the control unit, a task plan including tasks to be performed by an operator of the plurality of vehicles; and showing, by the control unit, the task plan on a display of the user interface.

Clause 11. The method of Clause 10, wherein the task plan is based on the data received from the plurality of vehicles.

Clause 12. The method of Clauses 10 or 11, wherein the task plan comprises a plurality of tasks for the plurality of vehicles, and wherein the plurality of tasks include required or recommended actions to be taken by the operator.

Clause 13. The method of any of Clauses 10-12, wherein each of the plurality of vehicles is an autonomous vehicle that automatically performs one or more operations without human intervention.

Clause 14. The method of any of Clauses 10-13, wherein each of the plurality of vehicle is an unmanned aerial vehicle.

Clause 15. The method of any of Clauses 10-14, wherein the control unit is remote from the plurality of vehicles.

Clause 16. The method of Clauses 10-15, further comprising automatically performing, by the control unit, one or more of the tasks in response to a deadline for the one or more tasks being reached without the operator performing the one or more tasks.

Clause 17. The method of any of Clauses 10-16, wherein said generating comprises generating the task plan based on relative urgency and temporal requirements of the tasks.

Clause 18. The method of any of Clauses 10-17, further comprising providing, by the control unit on the display, at least one alert indicator with respect to at least one of the tasks within the task plan.

Clause 19. A system comprising:

a plurality of vehicles, wherein each of the plurality of vehicles is an autonomous vehicle that automatically performs one or more operations without human intervention;

a user interface including a display; and a control unit in communication with the user interface and the plurality of vehicles, wherein the control unit is remote from the plurality of vehicles, wherein the control unit is configured to receive data from the plurality of vehicles and generate a task plan including tasks to be performed by an operator of the plurality of vehicles, wherein the task plan is based on the data received from the plurality of vehicles, wherein the task plan comprises a plurality of tasks for the plurality of vehicles, wherein the plurality of tasks include required or recommended actions to be taken by the operator, wherein the control unit is configured to generate the task plan based on relative urgency and temporal requirements of the tasks, and wherein the control unit is further configured to show the task plan on the display.

Clause 20. The system of Clause 19, wherein the control unit is further configured to automatically perform one or more of the tasks in response to a deadline for the one or more tasks being reached without the operator performing the one or more tasks.

As described herein, examples of the present disclosure provide systems and methods for efficiently managing tasks of autonomous vehicles. Further, examples of the present disclosure provide systems and methods for assisting an operator of multiple autonomous vehicles in relation to the various tasks for the vehicles.

While various spatial and directional terms, such as top, bottom, lower, mid, lateral, horizontal, vertical, front and the like can be used to describe examples of the present disclosure, it is understood that such terms are merely used with respect to the orientations shown in the drawings. The orientations can be inverted, rotated, or otherwise changed, such that an upper portion is a lower portion, and vice versa, horizontal becomes vertical, and the like.

As used herein, a structure, limitation, or element that is "configured to" perform a task or operation is particularly structurally formed, constructed, or adapted in a manner corresponding to the task or operation. For purposes of clarity and the avoidance of doubt, an object that is merely capable of being modified to perform the task or operation is not "configured to" perform the task or operation as used herein.

It is to be understood that the above description is intended to be illustrative, and not restrictive. For example, the above-described examples (and/or aspects thereof) can be used in combination with each other. In addition, many modifications can be made to adapt a particular situation or material to the teachings of the various examples of the disclosure without departing from their scope. While the dimensions and types of materials described herein are intended to define the parameters of the various examples of the disclosure, the examples are by no means limiting and are exemplary examples. Many other examples will be apparent to those of skill in the art upon reviewing the above description. The scope of the various examples of the disclosure should, therefore, be determined with reference to the appended claims, along with the full scope of equivalents to which such claims are entitled. In the appended claims and the detailed description herein, the terms "including" and "in which" are used as the plain-English equivalents of the respective terms "comprising" and "wherein." Moreover, the terms "first," "second," and "third," etc. are used merely as labels, and are not intended to impose numerical requirements on their objects. Further, the limitations of the following claims are not written in means-plus-function format and are not intended to be interpreted based on 35 U.S.C. § 112(f), unless and until such claim limitations expressly use the phrase "means for" followed by a statement of function void of further structure.

This written description uses examples to disclose the various examples of the disclosure, including the best mode, and also to enable any person skilled in the art to practice the various examples of the disclosure, including making and using any devices or systems and performing any incorporated methods. The patentable scope of the various examples of the disclosure is defined by the claims, and can include other examples that occur to those skilled in the art. Such other examples are intended to be within the scope of the claims if the examples have structural elements that do not differ from the literal language of the claims, or if the examples include equivalent structural elements with insubstantial differences from the literal language of the claims.

What is claimed is:

1. A system for managing operation of a plurality of unmanned aerial vehicles (UAVs), the system comprising:
   a user interface including a display;
   a communication device; and
   a control unit including one or more processors, wherein the control unit is communicatively coupled to the communication device, wherein the control unit is in communication with the user interface and the plurality of UAVs through the communication device, wherein the control unit is configured to receive data including locations and task deadlines through the communication device from the plurality of UAVs, the control unit configured to generate a task plan including tasks to be performed by a remote operator of the plurality of UAVs, the tasks including handing off at least one of the UAVs from an approach controller to a tower controller while the at least one of the UAVs autonomously approaches a landing, wherein the control unit is further configured to show the task plan on the display, wherein the control unit is further configured to show on the display, for the tasks, estimated availability times, estimated work lengths, times tasks are worked, the task deadlines, one or more task completed icons, and one or more uncompleted task icons, the control unit configured to prioritize the tasks in the task plan according to the locations and the task deadlines, the control unit configured to keep the tasks involved with the handing off the at least one of the UAVs from the approach controller to the tower controller unavailable to the operator until the operator is in communication contact with the approach controller.

2. The system of claim 1, wherein the task plan is based on the data received from the plurality of UAVs.

3. The system of claim 1, wherein the task plan comprises a plurality of the tasks for the plurality of UAVs, and wherein the plurality of the tasks include required or recommended actions to be taken by the operator.

4. The system of claim 1, wherein each of the plurality of UAVs is an autonomous UAV that automatically performs one or more operations without human intervention.

5. The system of claim 1, wherein the control unit is remote from the plurality of UAVs.

6. The system of claim 1, wherein the control unit is further configured to automatically perform one or more of the tasks in response to the task deadlines being reached without the operator performing the tasks.

7. The system of claim 1, wherein the control unit is configured to generate the task plan based on relative urgency and temporal requirements of the tasks.

8. The system of claim 1, wherein the control unit is further configured to provide, on the display, at least one alert indicator with respect to at least one of the tasks within the task plan.

9. A method for managing operation of a plurality of unmanned aerial vehicles (UAVs), the method comprising:
   receiving, by a control unit, including one or more processors, in communication with a user interface and the plurality of UAVs through a communication device, data including locations and task deadlines from the plurality of UAVs;
   generating, by the control unit, a task plan including tasks to be performed by a remote operator of the plurality of UAVs, the tasks including handing off at least one of the UAVs from an approach controller to a tower controller while the at least one of the UAVs autonomously approaches a landing;
   prioritizing, by the control unit, the tasks in the task plan according to the locations and the task deadlines;
   showing, by the control unit, the task plan on a display of the user interface, the task plan shown on the display with the tasks involved with the handing off the at least one of the UAVs from the approach controller to the tower controller unavailable to the operator until the operator is in communication contact with the approach controller;
   showing, by the control unit on the display, for the tasks, estimated availability times, estimated work lengths, times tasks worked, task deadlines, one or more task completed icons, and one or more uncompleted task icons; and
   operating the plurality of vehicles according to the tasks of the task plan.

10. The method of claim 9, wherein the task plan is based on the data received from the plurality of UAVs.

11. The method of claim 9, wherein the task plan comprises a plurality of the tasks for the plurality of UAVs, and wherein the plurality of the tasks include required or recommended actions to be taken by the operator.

12. The method of claim 9, wherein each of the plurality of UAVs is an autonomous UAV that automatically performs one or more operations without human intervention.

13. The method of claim 9, wherein the control unit is remote from the plurality of UAVs.

14. The method of claim 9, further comprising automatically performing, by the control unit, one or more of the tasks in response to the task deadline for the one or more of the tasks being reached without the operator performing the one or more of the tasks.

15. The method of claim 9, wherein said generating comprises generating the task plan based on relative urgency and temporal requirements of the tasks.

16. The method of claim 9, further comprising providing, by the control unit on the display, at least one alert indicator with respect to at least one of the tasks within the task plan.

17. A system comprising:
   a user interface including a display;
   a communication device; and
   a control unit including one or more processors, wherein the control unit is communicatively coupled to the communication device and is in communication with the user interface and a plurality of autonomous unmanned aerial vehicles (UAVs) through the communication device, the control unit located remote from a plurality of UAVs, wherein the control unit is configured to receive data including locations and task deadlines through the communication device from the plurality of UAVs and generate a task plan including tasks to be performed by an operator of the plurality of UAVs, wherein the task plan is based on the data received from the plurality of UAVs, wherein the task plan comprises a plurality of tasks for the plurality of UAVs, wherein the plurality of tasks include required or recommended actions to be taken by the operator, wherein the control unit is configured to generate the task plan based on relative urgency and temporal requirements of the tasks, wherein the control unit is further configured to show the task plan on the display, wherein the control unit is further configured to show on the display, for one or more of the tasks, an estimated availability time, an estimated work length, a time task worked, a task deadline, a task completed icon, and an uncompleted task icon, and wherein the plurality of UAVs are operated according to the plurality of tasks of the task plan, the control unit configured to prioritize the tasks in the task plan according to the locations and the task deadlines, the control unit configured to keep the tasks involved with handing off the at least one of the UAVs from an approach controller to a tower controller unavailable to the operator until the operator is in communication contact with the approach controller, the task plan shown on the display with the tasks involved with the handing off the at least one of the UAVs from the approach controller to the tower controller unavailable to the operator until the operator is in communication contact with the approach controller.

18. The system of claim 17, wherein the control unit is further configured to automatically perform one or more of the tasks in response to a deadline for the one or more of the tasks being reached without the operator performing the one or more of the tasks.

19. The system of claim 1, wherein the control unit is further configured to sort the tasks and show the tasks on the display based on:
   warning-level tasks;
   caution-level tasks; and
   advisory-level tasks,
   wherein the warning-level tasks are listed before the caution-level tasks and the advisory-level tasks, wherein the caution-level tasks are listed before the advisory-level tasks and before the advisory-level tasks, and wherein the advisory-level tasks are listed after the warning-level tasks and the caution-level tasks.

20. The system of claim 1, wherein the control unit is further configured to:
   identify gaps in which the operator is not scheduled to be working on any of the tasks,
   identify, for each of the gaps, collections of the tasks that are scheduled to be worked after each of the gaps,
   identify, for each of the collections, the tasks that are small enough, in terms of estimated time worked, to fit in one of the gaps,
   reposition each of the tasks that are small enough before one of the tasks taking place after an associated one of the gaps.

* * * * *